United States Patent Office 3,214,412
Patented Oct. 26, 1965

3,214,412
1,2 - BIS(DIALKYLAMINO) - 1,2 - DIISOCYANATO-
ETHYLENES AND N,N'-BIS(α-FLUORODIALKYL-
AMINOMETHYL) URETIDINE DIONES
Morton Brown, Wilmington, Del., assignor to E. I. du
Pont de Nemours and Company, Wilmington, Del., a
corporation of Delaware
No Drawing. Filed Aug. 23, 1962, Ser. No. 218,830
21 Claims. (Cl. 260—77.5)

This application is a continuation-in-part of my copending application Serial No. 18,875, filed March 31, 1960, and now abandoned.

This invention relates to new compositions of matter, having as its principal objects provision of novel monomers and polymers and of methods for their preparation.

It has been discovered that when an α,α-difluoromethyldialkylamine is treated with an excess of an alkali metal cyanate, there is obtained a mixture of products consisting of 1,2-bis(dialkylamino)-1,2-diisocyanatoethylene and N,N'-bis(α-fluorodialkylaminomethyl)uretidine dione.

This invention thus provides new 1,2-bis(dialkylamino)-1,2-diisocyanatoethylenes and N,N'-bis(α-fluorodialkylaminomethyl)uretidine diones, and a method for their preparation by reacting an alkali metal cyanate with an α,α-difluoromethyldialkylamine. It also provides polymers by reaction of the 1,2-diisocyanatoethylenes or the diones with compounds containing a plurality of Zerewitinoff active hydrogens, particularly glycols.

In a convenient method for preparing the monomeric compositions of this invention, a reactor equipped with a stirrer and condenser is charged with a solution of α,α-difluoromethyldialkylamine, for example, α,α-difluorotrimethylamine, in a medium such as tetrahydrofuran. A molar excess of an alkali metal cyanate (solid) is added and the mixture is heated under reflux for at least 20 hours. Thereafter the reaction mixture is allowed to cool and filtered, and the filtrate is subjected to fractional distillation to separate the desired cis-trans 1,2-bis(dialkylamino)-1,2-diisocyanatoethylene and N,N'-bis(α-fluorodialkylaminomethyl)uretidine dione. The reaction which occurs is schematically represented below. It is to be understood that while formation of the cis-form of the ethylenic product is shown, the trans-form also exists and a cis-trans mixture is generally obtained.

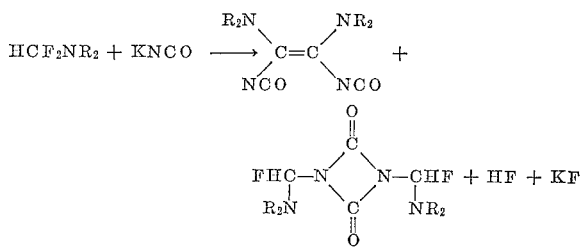

This reaction is general to alkali metal cyanates and α,α-difluoromethyldialkylamines. Preferred for the purposes of the present invention, however, are potassium cyanate and amines in which the R's (alike or different, i.e., R' and R") are alkyl groups containing 1–18 carbon atoms or cycloalkyl groups of up to 7 atoms.

The α,α-difluoromethyldialkylamines are readily prepared by the reaction of sulfur tetrafluoride on certain amides as shown by Smith, U.S. Patent 2,859,245, issued November 4, 1958. They can also be prepared by substituting carbonyl fluoride for sulfur tetrafluoride in the reaction of the Smith patent. α,α-Difluorotrimethylamine, used in Examples I and II, below, can be prepared as follows:

A corrosion-resistant pressure vessel having a capacity corresponding to 500 parts of water is charged with 146 parts of N,N-dimethylformamide and 33 parts of carbonyl fluoride. The reaction mixture is maintained under autogenous pressure at 25° C. for 21 hours. Fractional distillation of the reaction product produces 30 parts of α,α-difluorotrimethylamine boiling at 47–51.5° C. The identity of the compound is confirmed by nuclear magnetic resonance.

To prepare other difluoromethyldialkylamines, other N,N-dialkylsubstituted formamides can be substituted for N,N-dimethylformamide in the synthesis of the immediately preceding paragraph. In general, there may be used N,N-dialkylsubstituted formamides of the formula HCONRR', in which R and R' may be the same or different alkyl, including cycloalkyl groups. It is preferred that R and R' be alkyl groups of no more than 18 carbons because of availability and solubility characteristics. Specific examples of operable N,N-dialkylsubstituted formamides, in addition to N,N-dimethylformamide, are N,N-diethylformamide, N,N-dibutylformamide, N,N-dioctylformamide, N,N-didodecylformamide, N,N-dioctadecylformamide, N-isobutyl-N-methylformamide, N-cyclohexyl-N-methylformamide, and the like.

As noted, any alkali metal cyanate, e.g., NaNCO, LiNCO, CsNCO, etc., can be used in the process of this invention. Potassium cyanate is preferred, however, in spite of its higher cost because it gives the best results from the standpoint of yield of desired products. The theoretical amount of alkali metal cyanate required to react with the α,α-difluoromethyldialkylamine to produce the products of this invention is that molarly equivalent to the α,α-difluoromethyldialkylamine. In practice, a larger amount, up to 2.0 or more moles of the cyanate per mole of the amine, is used. The ratio of reactants, is, in any event, not critical.

The reaction between the alkali metal cyanate and the α,α-difluoromethyldialkylamine is carried out in a medium which is inert to the reactants and reaction products. A suitable and preferred medium is tetrahydrofuran, but in its place there can be used dioxane, ethylene glycol dimethyl ether, acetonitrile, cyclohexane, and the like. The amount of reaction medium is not critical and can vary over wide limits. Thus, it can equal or exceed by many fold the weight of the reactants.

The reaction is conducted with the exclusion of air and moisture at the reflux temperature of the reaction medium. This temperature varies, of course, depending upon the particular medium employed, but is generally above 60° C. but below 200° C.

Usually the reaction is conducted at ambient pressure, although super- or subatmospheric pressures can be used. However, the use of such super- or subatmospheric pressures has no practical advantage but rather complicates equipment and procedural requirements.

The time of reaction is at least 20 hours but generally there is no advantage in more than 100 hours. The best results are obtained in the time interval of 30 to 80 hours.

The polymeric compositions of this invention, i.e., the polymers prepared by reaction of N,N'-bis(α-fluorodialkylaminomethyl)uretidine diones or of the 1,2-bis(dialkylamino)-1,2-diisocyanatoethylenes, with complementary reactants, especially with glycols, are readily prepared by contacting the reactants generally in an anhydrous liquid inert organic reaction medium, e.g., an ether, at any convenient pressure and at a temperature up to the decomposition temperature of the polymer. The polymers form films useful as protective coatings. It is to be understood that in preparing the polymeric compositions there can be used in place of glycols other compounds containing active hydrogen, as determined by the Zerewitinoff method. Examples of such compounds are diamines, such as 1,2-diaminoethane, 1,4-diaminobutane, 1,6-diamonohexane, and the like.

There follow some examples which illustrate, but do not limit, this invention. In these examples, all pressures are ambient atmospheric unless otherwise indicated.

*Example I*

In a 500-ml. three-necked flask fitted with a mercury-sealed stirrer and reflux condenser, protected by calcium chloride tubes, is placed a mixture of 200 ml. of dry ethylene glycol dimethyl ether, 38 g. of a $\alpha,\alpha$-difluorotrimethylamine (0.4 mole), and 60 g. (0.74 mole) of potassium cyanate.

The mixture is stirred under reflux for 72 hours, cooled, and filtered. The filtrate is concentrated under aspirator pressure and the dark residual oil (which sometimes partially crystallizes) is rapidly distilled at 1–2 mm. The distillate, a yellow semi-solid, is distilled through a three-foot spinning band column yielding (A) 18.4 g., B.P. 119–120° (2.5 mm.), $n_D^{25}$ 1.4852 and (B) 6.3 g., B.P. 125–128° (1.2 mm.), $n_D^{25}$ 1.4900.

A. Fraction A is a yellow, low-melting solid (ca. 40° C.) which reacts vigorously with water yielding fluoride ion.

*Anaylsis.*—Calcd. for $C_8H_{14}N_4F_2O_2$: C, 40.68; H, 5.98; N, 23.72; M.W., 236. Found: C, 40.51; H, 6.11; N, 23.56; M.W., 220.

The infrared spectrum shows no isocyanate absorption but does show strong absorption at $5.70\mu$, attributable to an N—C=O moiety in a strained ring. The nuclear magnetic resonance spectrum shows only one type of fluorine atom and two types of protons in the ratio of 6:1. These data are consistent with the structure N,N'-bis($\alpha$-fluorodimethylaminoethyl)uretidine dione.

A sheet of highly absorbent paper is wet with a few drops of N,N'-bis($\alpha$-fluorodimethylaminomethyl)uretidine dione, prepared as above, and warmed under an infrared lamp. The resulting product has increased stiffness and water repellency, as judged by the time required to absorb a drop of water in comparison with untreated absorbent paper.

N,N'-bis($\alpha$-fluorodimethylaminomethyl)uretidine dione is a useful polymer intermediate as illustrated below:

(1) N,N' - bis($\alpha$ - fluorodimethylaminomethyl)uretidine dione (10 g., 0.0424 mole) is dissolved in 50 ml. of dry tetrahydrofuran. The solution is cooled to 0° C. and one molar equivalent of ethylene glycol in 10 ml. of dry tetrahydrofuran is added dropwise. The reaction is exothermic and a white solid rapidly precipitates. The solid is collected on a filter giving a practically quantitative yield of an amorphous white solid which can be readily purified by solution in acetone or demethylformamide and reprecipitation with ether or pentane. Films useful as protective coatings can be cast from acetone and methyl ethyl ketone.

The infrared spectrum indicates the presence of a urea-type carbonyl moiety in a strained ring at $5.85\mu$ and ether absorption at $9.45\mu$. There is also absorption at $3.0\mu$ (broad band) attributable to $R_3NH$ groups in the polymer. The hydrogen fluoride evolved in the polymerization is the cause of this salt formation.

*Analysis.*—Calcd. for $(C_{10}H_{18}N_4O_4)_x$: C, 37.2; H, 5.60; F, 0.00. Found: C, 35.31, 35.27; H, 5.93, 5.78; F, 1.26, 1.38.

The inherent viscosity is 0.07 at 0.5% concentration in dimethylformamide at 25° C.; and (2) N,N' - bis($\alpha$ - fluorodimethylaminomethyl)uretidine dione is treated with neopentyl glycol in tetrahydrofuran solution in a manner similar to the preceding example. The resulting polymer is soluble in tetrahydrofuran and is precipitated by hexane giving a quantitative yield of a white, granular polymer. Films useful as protective coatings are cast from tetrahydrofuran and methyl ethyl ketone. The infrared spectrum is qualitatively similar to that of the polymer from ethylene glycol.

*Analysis.*—Calcd. for $(C_{13}H_{24}N_4O_4)_x$: C, 52.0; H, 8.0; F, 0.00. Found: C, 51.06, 50.83; H, 7.37, 7.56; F, 1.89, 1.76.

The inherent viscosity of the polymer at 0.5% concentration in dimethylformamide at 25° C. is 0.06.

B. Fraction B shows strong —N=C=O moiety absorption in the infrared spectrum and C=C absorption at $6.05\mu$. The ultraviolet spectrum of the compound in acetonitrile shows $\lambda_{max.}=276$ m$\mu$, $\epsilon_{max.}=7680$. The nuclear magnetic resonance spectrum indicates only one type of proton existing as a cis-trans mixture.

*Analysis.*—Calcd. for $C_8H_{12}N_4O_2$: C, 48.97; H, 6.17; N, 28.56. Found: C, 48.36; H, 6.12; N, 29.00; F, <0.2.

The experimental evidence fits the structure

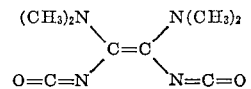

*Example II*

A mixture of 76 g. (0.8 mole) of $\alpha,\alpha$-difluorotrimethylamine, 500 ml. of dry tetrahydrofuran, and 81 g. (1.0 mole) of potassium cyanate is heated under reflux for 48 hours in a 1-l. three necked flask fitted with a stainless steel mechanical stirrer and a condenser protected with a calcium chloride tube. After the reflux period, the mixture is cooled and filtered. The filtrate is concentrated under nitrogen at aspirator pressure. The residual oil is distilled through a short Vigreux column under nitrogen yielding 71 g. of a yellow oil, B.P. 105–110° C. (1.7–1.9 mm.). Redistillation through a three-foot spinning band column yields 49.6 g. of N,N'-bis($\alpha$-fluorodimethylaminomethyl)uretidine dione, B.P. 119–121° (2.5 mm.), and 18.6 g. of 1,2-bis(dimethylamino)-1,2-diisocyanatoethylene, B.P. 125–128° (1.2 mm.).

A sheet of highly absorbent paper is wet with a few drops of the 1,2-diisocyanatoethylene, prepared as above, and warmed to $\sim$50° C. in a small oven. The resulting product has increased stiffness and increased water repellency, as judged by the time required to absorb a drop of water relative to the untreated absorbent paper control. The control absorbed a drop of water instantaneously. The treated sheet required 20–30 seconds to completely absorb a drop.

Three grams (0.0154 mole) of the 1,2-diisocyanatoethylene, prepared as in Example II, in ether (50 ml.) at 0° C. is treated dropwise with one molar equivalent of ethylene glycol in 10 ml. of ether. An exothermic reaction takes place with a semi-solid polymer precipitating from the solvent. The ether is evaporated and the polymer is taken up in dimethylformamide and reprecipitated by addition to water. The tacky solid yields opaque films when pressed at 150° C. and 6000 p.s.i. for 10 min.

*Analysis.*—Calcd. for $(C_{10}H_{12}N_4O_4)_x$: C, 55.6; H, 5.6; N, 25.4. Found: C, 55.3; H, 5.5; N, 25.3.

Operable $\alpha,\alpha$-difluoromethyldialkylamines in addition to the $\alpha,\alpha$-difluorotrimethylamine of the detailed examples are those which correspond to $HCF_2$—$NR_2$, in which the R's are the same or different alkyl groups of 1 to 18 carbon atoms or cycloalkyl of up to 7 carbon atoms. Examples are $\alpha,\alpha$-difluoromethyldiethylamine,
$\alpha,\alpha$-difluoromethyldiisobutylamine,
$\alpha,\alpha$-difluoromethylmethyloctylamine,
$\alpha,\alpha$-difluoromethyldicyclohexylamine,
$\alpha,\alpha$-difluoromethyldidodecylamine,
$\alpha,\alpha$-difluoromethylbutyltetradecylamine,
$\alpha,\alpha$-difluoromethyldioctadecylamine, and the like.

If the above amines are used in place of the $\alpha,\alpha$-difluorotrimethylamine of Example I in the process of Example I, the products obtained would be as indicated in the table below.

| Amine | Product |
|---|---|
| α,α-difluoromethyl-diethylamine | 1,2-bis(diethylamino)-1,2-diisocyanatoethylene.<br>N,N′-bis(α-fluorodiethylaminomethyl)-uretidine dione. |
| α,α-difluoromethyl-diisobutylamine. | 1,2-bis(diisobutylamino)-1,2-diisocyanatoethylene.<br>N,N′-bis(α-fluorodiisobutylaminomethyl)uretidine dione. |
| α,α-difluoromethyl-methyloctylamine. | 1,2-bis(methyloctylamino)-1,2-diisocyanatoethylene.<br>N,N′-bis(α-fluoromethyloctylaminomethyl)uretidine dione. |
| α,α-difluoromethyl-didodecylamine. | 1,2-bis(didodecylamino)-1,2-diisocyanatoethylene.<br>N,N′-bis(α-fluorodidodecylaminomethyl)uretidine dione. |
| α,α-difluoromethyl-butyltetradecylamine. | 1,2-bis(butyltetradecylamino)-1,2-diisocyanatoethylene.<br>N,N′-bis(α-fluorobutyltetradecylaminomethyl)uretidine dione. |
| α,α-difluoromethyl-dioctadecylamine. | 1,2-bis(dioctadecylamino)-1,2-diisocyanatoethylene.<br>N,N′-bis(α-fluorodioctadecylaminomethyl)uretidine dione. |

The monomers of this invention are useful polymer intermediates and produce parchmentizing effects on paper, as already illustrated.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process which comprises reacting together an α,α-difluoromethyldialkylamine of the formula $$HCF_2NR'R''$$

wherein R′ and R″ are selected from the group consisting of alkyl of up to 18 carbons and cycloalkyl of up to 7 carbons and an alkali metal cyanate in an inert liquid reaction medium.

2. The process which comprises reacting together α,α-difluorotrimethylamine and an alkali metal cyanate in an inert liquid reaction medium.

3. The process of claim 2 in which the liquid reaction medium is an ether.

4. The process which comprises reacting together α,α-difluorotrimethylamine and potassium cyanate in ethylene glycol dimethylene ether.

5. The process which comprises reacting together α,α-difluorotrimethylamine and potassium cyanate in tetrahydrofuran.

6. N,N′ - bis(α - fluorodimethylaminomethyl)uretidine dione.

7. 1,2-bis(dimethylamino)-1,2-diisocyanatoethylene.

8. The process which comprises reacting together in the liquid phase an N,N′-bis(α-fluorodialkylaminomethyl)uretidine dione wherein the alkyl groups are selected from the group consisting of alkyl of up to 18 carbons and cycloalkyl of up to 7 carbons and a member of the group consisting of ethylene glycol, neopentyl glycol, 1,2-diaminoethane, 1,4-diaminobutane and 1,6-diaminohexane.

9. The process which comprises reacting together N,N′ - bis(α - fluorodimethylaminomethyl)uretidine dione and a member of the group consisting of ethylene glycol, neopentyl glycol, 1,2-diaminoethane, 1,4-diaminobutane and 1,6-diaminohexane.

10. The process which comprises reacting together N,N′-bis(α - fluorodimethylaminomethyl)uretidine dione and ethylene glycol in anhydrous liquid tetrahydrofuran.

11. The process which comprises reacting together N,N′-bis(α - fluorodimethylaminomethyl)uretidine dione and neopentyl glycol in anhydrous liquid tetrahydrofuran.

12. The polymer of an N,N′-bis(α-fluorodialkylaminomethyl)uretidine dione wherein the alkyl groups are selected from the group consisting of alkyl of up to 18 carbons and cycloalkyl of up to 7 carbons and a member of the group consisting of ethylene glycol, neopentyl glycol, 1,2-diaminoethane, 1,4-diaminobutane and 1,6-diaminohexane.

13. The polymer of N,N′-bis(α-fluorodimethylaminomethyl)uretidine dione and ethylene glycol.

14. The polymer of N,N′-bis(α-fluorodimethylaminomethyl)uretidine dione and neopentyl glycol.

15. A polymer of claim 12 in the form of a film.

16. The polymer of claim 13 in the form of a film.

17. The polymer of claim 14 in the form of a film.

18. The polymer of 1,2-bis(dimethylamino)-1,2-diisocyanatoethylene and ethylene glycol.

19. A 1,2-bis(dialkylamino)-1,2-diisocyanatoethylene of the formula

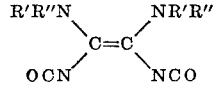

wherein R′ and R″ are selected from the group consisting of alkyl of up to 18 carbons and cycloalkyl of up to 7 carbons.

20. A uretidine dione of the formula

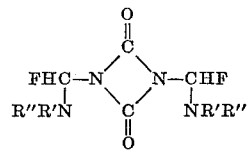

wherein R′ and R″ are selected from the group consisting of alkyl of up to 18 carbons and cycloalkyl of up to 7 carbons.

21. The polymer of a 1,2-bis(dialkylamino)-1,2-diisocyanatoethylene wherein the alkyl groups are selected from the group consisting of alkyl of up to 18 carbons and cycloalkyl of up to 7 carbons and a member of the group consisting of ethylene glycol, neopentyl glycol, 1,2-diaminoethane, 1,4-diaminobutane and 1,6-diaminohexane.

References Cited by the Examiner
UNITED STATES PATENTS

| 2,834,756 | 5/58 | Suen et al. | 260—72 |
| 2,883,388 | 4/59 | England | 260—453 |
| 2,968,672 | 1/61 | Ephraim | 260—77.5 X |

LEON J. BERCOVITZ, *Primary Examiner.*

DONALD E. CZAJA, *Examiner.*